United States Patent [19]

Oestreich

[11] Patent Number: 4,724,667

[45] Date of Patent: Feb. 16, 1988

[54] METHOD AND APPARATUS FOR SZ-STRANDING OF ELEMENTS

[75] Inventor: Ulrich Oestreich, Munich, Fed. Rep. of Germany

[73] Assignee: Siemens Aktiengesellschaft, Berlin and Munich, Fed. Rep. of Germany

[21] Appl. No.: 6,877

[22] Filed: Jan. 27, 1987

[30] Foreign Application Priority Data

Feb. 6, 1986 [DE] Fed. Rep. of Germany ....... 3603734

[51] Int. Cl.[4] .................. D07B 3/00; D07B 7/00
[52] U.S. Cl. ............................................. 57/294
[58] Field of Search ..................... 57/293, 294, 355

[56] References Cited

U.S. PATENT DOCUMENTS

| | | | |
|---|---|---|---|
| 4,359,857 | 11/1982 | Oestreich | 57/294 X |
| 4,359,860 | 11/1982 | Schleese et al. | 57/294 X |
| 4,429,521 | 2/1984 | Oestreich | 57/294 |
| 4,432,199 | 2/1984 | Dzyck et al. | 57/294 |
| 4,434,610 | 3/1984 | Oestreich | 57/294 |
| 4,528,810 | 7/1985 | Vogelsberg | 57/294 |

*Primary Examiner*—Donald Watkins
*Attorney, Agent, or Firm*—Hill, Van Santen, Steadman & Simpson

[57] ABSTRACT

A stranding device having a rotatable tube store and method of stranding with the tube store characterized by lubricating a surface of the tube store by either applying drops of lubricant to the surface, moistening the elements being stranded prior to engaging the surface, or both, to reduce the friction of the surface of the tube store engaged by the elements being stranded.

13 Claims, 1 Drawing Figure

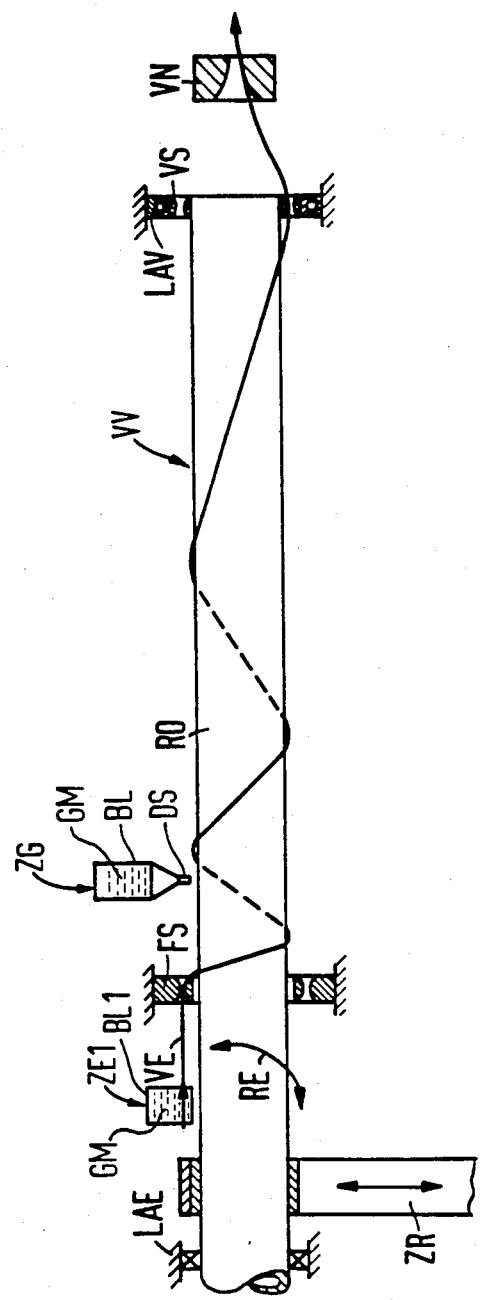

METHOD AND APPARATUS FOR SZ-STRANDING OF ELEMENTS

BACKGROUND OF THE INVENTION

The invention is directed to a method and apparatus for SZ-stranding of electrical and/or optical stranding elements which are supplied to a device having a reversibly driven stranding disk associated with a tube store so that the unstranded stranding elements lie on the surface of the tube store as they approach the stranding disk.

In SZ-stranding by utilizing a device having tube stores, the supplied stranding elements roll off of an outside surface of the rotating tube store which transmits the torque thereto. The location of the greatest roll-off is in the region of the perforated guide disk and a location of the less roll-off in the region of the stranding disk. Since the stranding disk itself represents a roll-off brake, torques are transmitted from the entry region onto the stranding region dependent on the distribution of the frictional forces being transmitted faster or more slowly, dependent on the torsional stiffness of the respective stranding elements. In the stranding region itself, the braking movements at the stranding disk are compensated either directly or delayed so that the stranding incurs with a low torsion or with no torsion at all. Excessively high frictional forces of the tube store are a disturbing factor in the distribution of the stranding element on the tube store and for the stranding process itself. These frictional forces can lead to a modulation of the forces at the stranding point which is depended on the store content. In addition, an excessive concentration of wrapping on the tube store can occur at the entry side.

In U.S. Pat. No. 4,434,610, whose disclosure is incorporated by reference thereto and which claims priority from German application No. 32 10 611, a device for SZ-stranding of electrical and optical stranding elements utilizing a tube or pipe store was disclosed. The material of the tube store is composed of a carbon fiber material bonded with hardened resin. In this way, it became possible to reduce the undesirable high frictional forces to a certain degree and these undesirable high frictional forces occurred, for example, given a tube store formed of polished steel. However, an undesirable high wear of the tubes constructed of carbon fiber can also occur.

SUMMARY OF THE INVENTION

The object of the present invention is to provide a process and apparatus which makes it possible in a simple fashion to reduce the coefficients of friction of the tube store for all types of stranded elements, even those having rubber coating or sheath.

In accordance with the invention, this is achieved in a method for SZ-stranding of electrical and/or optical stranding elements which method comprises providing an SZ-stranding apparatus having a reversibly rotating tube store with a stranding disk, feeding the unstranded stranding elements along the surface of the tube store to and through the stranding disk. The improvements comprises lubricating a portion of the surface of the tube store. This can be by supplying a lubricant to the surface of the tube store and/or to the stranding elements as they enter the stranding device. An outside surface of the tube store provided with the lubricant will exhibit a coefficient of friction which is at most half as great as for example a normal polished steel tube. The $\mu$ value, which can be achieved in this manner, lie between 0.1 and 0.2, even when the initial value lies in the proximity of 1, which is a value for example for soft rubber, PVC and other similar materials.

It is especially expedient to apply the lubricant to the storage tube in a liquid form. It can therefore also be advantageous to apply a lubricant initially fluidized by a solvent which, after the solvent evaporates is then retained in the cable core, which is formed by the stranding device, in either a dry or solid condition.

Dissolved hard wax supplied particularly favorable properties as a lubricant. Long-chained benzene, particularly solvent naphtha, is suitable as a solvent.

Advantageously, the lubricant is distributed as uniformly as possible over the entire surface of the tube store so that the desired advantageous reduction in the coefficient of friction occurs everywhere on the surface of the tube store.

The invention also is directed to an improvement in an apparatus or device for SZ-stranding which device has a reversibly rotated tube store with a stranding disk, means for rotating the tube store, and an input end formed by a guide disk, the improvements are means for lubricating a portion of the surface of the tube store. The means for lubricating can be means for applying the lubricant to the surface of the tube store such as a supply vessel, which will emit the lubricant drop-by-drop onto the surface of the tube store, and/or means for moistening the elements being stranded as they enter into the stranding device.

BRIEF DESCRIPTION OF THE DRAWINGS

The FIGURE is a schematic side view with portions in cross section for purpose of illustration of a SZ-stranding device or apparatus in accordance with the present invention for practicing the method in accordance with the present invention.

DESCRIPTION OF THE PREFERRED EMBODIMENTS

The principles of the present invention are particularly useful in an SZ-stranding device or apparatus which is generally indicated at VV in the FIGURE. The stranding apparatus includes a tube store RO which serves as an actual guide and storage member. The tube store RO at one end is mounted by a bearing for rotation relative to the frame LAE and can be alternately rotated in opposite directions for certain time spans, as indicated by the arrow RE by a reversible operating drive means which includes a toothed belt ZR. For example, the drive can occur via a gear wheel attached to the tube store adjacent the bearing and this gear wheel is moved or rotated by the belt ZR. The stranding elements VE, only one being shown in the present example, are conducted through an opening in a stationary perforated guide disk FS at the input side or end of the device which as illustrated has a plurality of axially extending bores for the acceptance of each of the stranding elements. This perforated disk FS is rigidly connected to a corresponding frame or housing. A stranding disk VS is rigidly connected to the tube store RO, but may be separately driven under certain conditions, and is provided at the output of the tube store RO and rotatably seated on its outer peripheral by a bearing LAV in the frame or housing for the device. This stranding disk VS comprises a plurality of axial bores for the acceptance of the stranding elements VE. At the output of the SZ-stranding device, the stranding elements VE are conducted through a stranding nipple VN. The operating mode set forth here is to be interpreted only as an example, and accordingly is not applicable for the application of the lubricant.

Normally the tube store RO is composed of a highly polished, surface-hardened steel or some other suitable material, so that the coefficient of friction are always too high despite all exertions to the contrary and generally lie between 0.3 and 1. In accordance with the present invention, a simple alleviation for this problem is obtained wherein a feed means ZG for a lubricant can be positioned adjacent the surface of the tube store to drop the lubricant drop-by-drop in the entry region of the device, which is illustrated, is just following the perforated guide disk FS, as seen in direction of the stranding elements VE through the device VV. In the drawing, the feed means ZG is illustrated as a vessel BL which contains a lubricant GM and has a fine nozzle DS. In this example, the lubricant GM will drip onto the surface of the tube store RO through the nozzle DS. A regulating valve or the like can be provided in the region of the nozzle DS in order to make the metering of the drops of lubricant adjustable. Instead of utilizing a drip method from the container BL, the feed means ZG can include a metering pump which will convey the lubricant GM proportional to the haul-off speed of the stranding elements VE.

As a consequence of the longitudinal motion of the stranding elements VE during a stranding process, the movement of the stranding elements on the surface of the tube store RO will guarantee that the lubricant GM is continuously and uniformly distributed over the entire working surface of the tube store. For example, over the entire region which lies between the perforated guide disk FS and the stranding disk VS. The invention makes it possible to considerably reduce the coefficient friction on the outside surface of the tube store in a very simple manner and, thus, yields an especially uniform stranding of the core, a lower stress on the stranding elements and a more uniform distribution of the wrapping of the stranding elements along the tube store RO.

A dissolved hard wax is preferably employed as the lubricant. A long-chain benzene, for example a solvent naphtha, is preferably employed as the solvent with a polyethylene wax being preferably employed as the wax. (for instanace: "A-wax" of the mos Hochst H. G.) In its liquid condition, the lubricant GM reduces the coefficient of friction to below 0.1. In a dry condition, the lubricant will have a somewhat higher coefficient, but is still lower than normal for the surface without lubricant. The drying of the lubricant will occur due to evaporation of the solvent which is, for example, the solvent naphtha.

The chemical composition of the solvent GM should be selected so that insofar as possible, it does not deteriorate or, respectively, attack the insulation on the elements being stranded, for example electrical stranded elements, or attack the protective sheaths of the optical light waveguide elements.

As illustrated in the FIGURE, in addition to the feed means or supply means ZG or as an alternative thereto, a second supply means ZE1 can be provided to act directly on each of the stranding elements VE. This supply means ZE1 is expediently placed in a position preceding the perforated guide disk VS and is formed, for example, by a small container BL1 or by a metering pump. A lubricant GM is likewise provided in this container or to the pump. When a stranding element passes through the container BL1, the surface of the stranding element is moistened and the lubricant is thus distributed onto the surface of the tube store RO during the course of the stranding process. A lubricating and guiding effect on the surface of the tube store RO can therefore likewise be achieved, and this will result in corresponding reduction of the coefficient of friction.

It is also possible to undertake the feed of the lubricant GM in the region of the perforated guide disk FS. For example, in such a way that the lubricant will drip from the top to the bottom and therefore moisten the stranding elements passing through the guide disk.

The only thing that is decisive for a good moistening of the surface of the tube store RO is that the feed of lubricant be supplied as close as possible to the entry or input end of the device, for example in the region of the perforated guide disk FS of the tube store stranding means in order to guarantee a uniform distribution of the lubricant GM over the full working length. The lubricant should not become dry until the leads have been stranded and have passed through the stranding nipple VN and thus form a cable core.

Although various minor modifications may be suggested by those versed in the art, it should be understood that I wish to embody within the scope of the patent granted hereon all such modifications as reasonably and properly come within the scope of my contribution to the art.

I claim:

1. In a method for SZ-stranding of stranding elements including providing a SZ-stranding apparatus having an input end, a reversibly rotated stranding tube store having a stranding disk secured thereto, feeding unstranded elements to the input end of the apparatus to move along the surface of the tube store and through the stranding disk to be stranded into a cable, the improvement comprising lubricating a portion of the surface of the tube store between the input end and the stranding disk.

2. In a method according to claim 1, wherein the step of lubricating includes supplying a lubricant in a liquid form.

3. In a method according to claim 2, wherein the step of supplying a lubricant in a liquid form comprises providing a hard wax dissolved in a solvent as a liquid lubricant.

4. In a method according to claim 3, wherein the step providing the hard wax in a solvent, provides a hard wax in a slow-evaporating solvent so that the solvent evaporates in the later stranded cable and the lubricant residue is present in the stranded cable.

5. In a method according to claim 1, wherein the step of lubricating distributes the lubricant over the entire length of the tube store.

6. In a method according to claim 1, wherein the step of lubricating includes dripping the lubricant onto the surface of the tube store.

7. In a method according to claim 6, wherein the step of lubricating includes moistening the elements prior to engaging the surface of the tube store.

8. In a method according to claim 1, wherein the step of lubricating comprises moistening the group of elements prior to contacting the surface of the tube store to lubricate the surface.

9. In an apparatus for stranding including a tube store mounted for rotation and having a stranding disk secured thereto, means for rotating the tube store, and a stationary guide disk surrounding the rotatable tube store and forming an entrance to the device, the improvements comprising means for lubricating the surface of the tube store being provided adjacent the guide disk.

10. In an apparatus according to claim 9, wherein the means for lubricating comprises means for applying a lubricant directly to the surface of the tube store drop-by-drop.

11. In an apparatus according to claim 10, wherein the means for applying a lubricant comprises a supply vessel having a nozzle.

12. In an apparatus according to claim 10, wherein the means for lubricating include means for moistening the surfaces of each of the elements as they enter the guide disk of the apparatus.

13. In an apparatus according to claim 9, wherein the means for lubricating comprises means for moistening each of the elements with the lubricant as they enter the guide disk of the apparatus.

* * * * *